(12) United States Patent
Jaldén et al.

(10) Patent No.: US 11,451,278 B2
(45) Date of Patent: Sep. 20, 2022

(54) RECIPROCITY-BASED TRANSMISSION

(71) Applicant: Telefonaktiebolaget LM Ericsson (publ), Stockholm (SE)

(72) Inventors: Niklas Jaldén, Enköping (SE); Markus Ringström, Enebyberg (SE)

(73) Assignee: Telefonaktibolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/312,562

(22) PCT Filed: Dec. 11, 2018

(86) PCT No.: PCT/SE2018/051283
§ 371 (c)(1),
(2) Date: Jun. 10, 2021

(87) PCT Pub. No.: WO2020/122775
PCT Pub. Date: Jun. 18, 2020

(65) Prior Publication Data
US 2022/0060231 A1 Feb. 24, 2022

(51) Int. Cl.
*H04B 7/06* (2006.01)
*H04L 25/02* (2006.01)

(52) U.S. Cl.
CPC ......... *H04B 7/0617* (2013.01); *H04B 7/0639* (2013.01); *H04L 25/0202* (2013.01)

(58) Field of Classification Search
CPC .. H04B 7/0617; H04B 7/0639; H04L 25/0202
See application file for complete search history.

(56) References Cited

U.S. PATENT DOCUMENTS

2013/0162475 A1* 6/2013 Blech ............... G01S 13/42
342/368
2017/0012363 A1* 1/2017 Zou ............... H01Q 21/061
(Continued)

FOREIGN PATENT DOCUMENTS

WO 2018013238 A1 1/2018

OTHER PUBLICATIONS

International Search Report and Written Opinion dated Sep. 24, 2019 for International Application No. PCT/SE2018/051283 filed Dec. 11, 2018, consisting of 13-pages.
(Continued)

*Primary Examiner* — Jaison Joseph
(74) *Attorney, Agent, or Firm* — Christopher & Weisberg, P.A.

(57) ABSTRACT

Embodiments presented herein relate to a method for reciprocity-based transmission in a radio communication network. The method is performed in a base station and may include obtaining a channel estimation of Rx quantities of a set of receive, Rx, and transmit, Tx, distribution networks, obtaining a channel estimation of Rx quantities of a set of Rx distribution networks, and performing reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission. A method, a base station, a wireless device, a computer programs and a computer program product for reciprocity-based beamforming in a radio communication network are also presented.

16 Claims, 4 Drawing Sheets

(56) References Cited

U.S. PATENT DOCUMENTS

2017/0085302 A1* 3/2017 Tong ............... H04L 1/0001
2017/0134105 A1   5/2017 Miao et al.
2018/0019795 A1* 1/2018 Zhang .............. H04L 1/0026

OTHER PUBLICATIONS

Niklas Jaldén et al.: Channel Extrapolation; Ericsson Internal; EAB-11:038815 Uen, Rev A. Sep. 16, 2011, consisting of 22-pages.

* cited by examiner

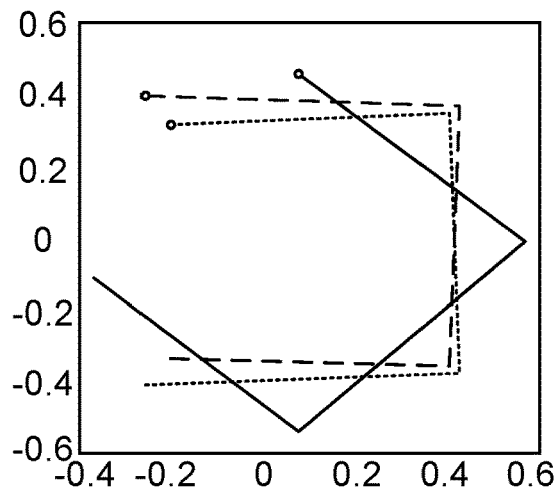
Fig. 8
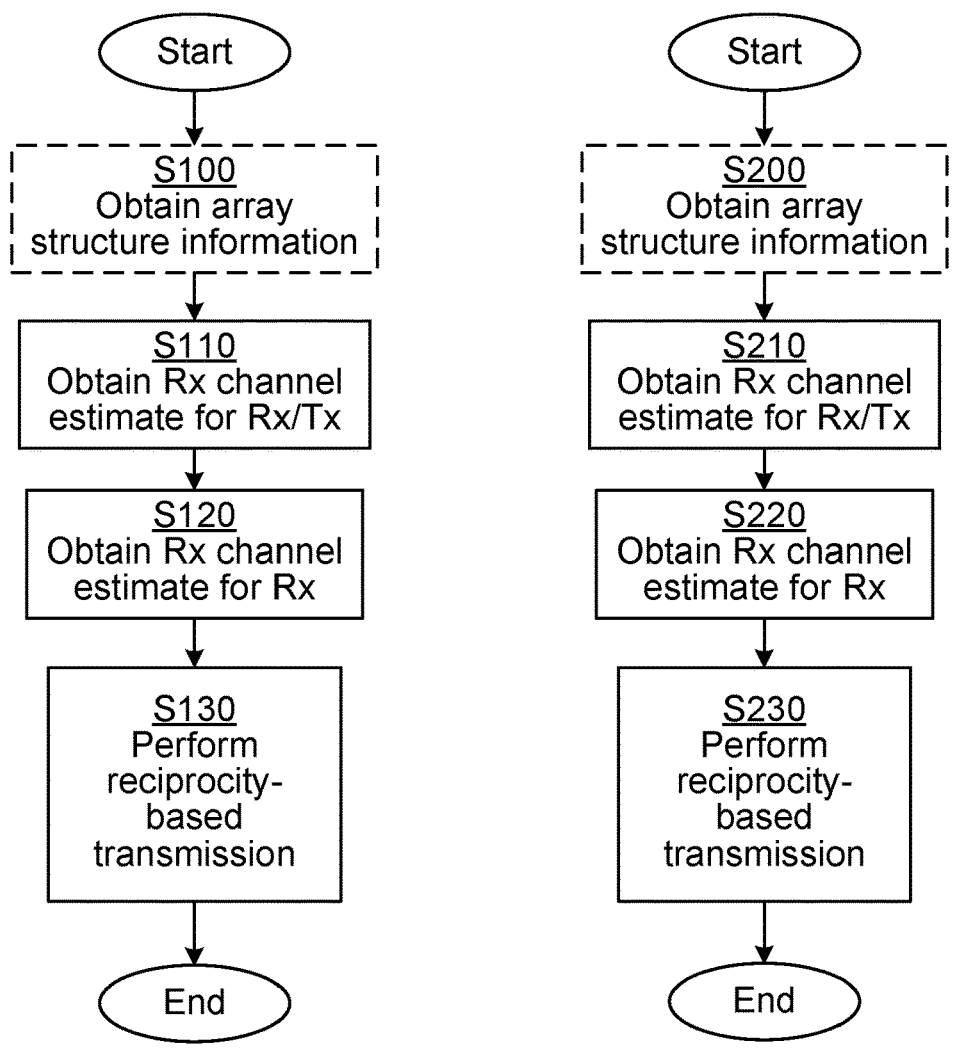
Fig. 9
Fig. 10

RECIPROCITY-BASED TRANSMISSION

CROSS-REFERENCE TO RELATED APPLICATIONS

This application is a Submission Under 35 U.S.C. § 371 for U.S. National Stage Patent Application of International Application Number: PCT/SE2018/051283, filed Dec. 11, 2018 entitled "RECIPROCITY-BASED TRANSMISSION," the entirety of which is incorporated herein by reference.

TECHNICAL FIELD

The present disclosure relates to methods, base station, wireless device, computer programs, and a computer program product for reciprocity-based transmission in a radio communication network.

BACKGROUND

In traditional mobile communication systems, at least for legacy frequency division duplex (FFD) systems, the number of receive (Rx) antennas is typically higher than the number of transmit (Tx) antennas at the base station (BS) side. The classical reason, stemming from voice services, has been to achieve balance between the downlink (DL) and uplink (UL) link budgets. Less output power in the UL is compensated with a better UL receiver, including e.g. more Rx antennas than in the terminal.

SUMMARY

One objective is to enable reciprocity-based transmission in radio communication networks.

According to a first aspect there is presented a method for reciprocity-based transmission in a radio communication network. The method is performed in a base station and comprises obtaining a channel estimation of receive (Rx) quantities of a set of Rx and transmit (Tx) distribution networks, obtaining a channel estimation of Rx quantities of a set of Rx distribution networks, and performing reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission.

By the presented method, reciprocity-based transmissions in 5G systems is enabled, also considering balance between the UL and DL link budgets.

According to an embodiment of the first aspect the step of performing further comprises performing reciprocity-based beamforming.

According to another embodiment of the first aspect, freely combinable with other embodiments thereof, the Rx distribution network channel estimates are given larger weights than the Rx and Tx distribution network channel estimate weights.

According to another embodiment of the first aspect, freely combinable with other embodiments thereof, the method further comprises obtaining information of an array structure of the set of Rx and Tx distribution networks and of an array structure of the set of Rx distribution networks, wherein the obtained information is utilized for the reciprocity-based beamforming.

According to another embodiment of the first aspect, freely combinable with other embodiments thereof, the antenna elements of the set of Rx distribution networks are interlaced with the antenna elements of the set of Rx and Tx distribution networks.

According to a second aspect there is presented method for reciprocity-based transmission in a radio communication network. The method is performed in a wireless device and comprises obtaining a channel estimation of Rx quantities of a set of Rx and Tx distribution networks, obtaining a channel estimation of Rx quantities of a set of Rx distribution networks, and performing reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission.

According to an embodiment of the second aspect, the step of performing further comprises performing reciprocity-based beamforming.

According to another embodiment of the second aspect, freely combinable with other embodiments thereof, the Rx distribution network channel estimates are given larger weights than the Rx and Tx distribution network channel estimate weights.

According to another embodiment of the second aspect, freely combinable with other embodiments thereof, the method further comprises obtaining information of an array structure of the set of Rx and Tx distribution networks and of an array structure of the set of Rx distribution networks, wherein the obtained information is utilized for the reciprocity-based beamforming.

According to another embodiment of the second aspect, freely combinable with other embodiments thereof, the antenna elements of the set of Rx distribution networks are interlaced with the antenna elements of the set of Rx and Tx distribution networks.

According to a third aspect there is presented a base station for reciprocity-based transmission in a radio communication network. The base station comprises a processing circuitry and a computer program product storing instructions that, when executed by the processing circuitry, causes the base station to obtain a channel estimation of Rx quantities of a set of Rx and Tx distribution networks, obtain a channel estimation of Rx quantities of a set of Rx distribution networks, and perform reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission.

According to an embodiment of the third aspect, the reciprocity-based transmission further comprises reciprocity-based beamforming.

According to another embodiment of the third aspect, freely combinable with other embodiments thereof, the Rx distribution network channel estimates are given larger weights than the Rx and Tx distribution network channel estimate weights.

According to another embodiment of the third aspect, freely combinable with other embodiments thereof, the base station further is caused to obtain information of an array structure of the set of Rx and Tx distribution networks and of an array structure of the set of Rx distribution networks, wherein the obtained information is utilized for the reciprocity-based beamforming.

According to another embodiment of the third aspect, freely combinable with other embodiments thereof, the antenna elements of the set of Rx distribution networks are interlaced with the antenna elements of the set of Rx and Tx distribution networks.

According to a fourth aspect there is presented a wireless device for reciprocity-based transmission in a radio communication network. The wireless device comprises a processing circuitry and a computer program product storing instructions that, when executed by the processing circuitry, causes the wireless device to obtain a channel estimation of Rx quantities of a set of Rx and Tx distribution networks, obtain a channel estimation of Rx quantities of a set of Rx distribution networks, and to perform reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission.

According to an embodiment of the fourth aspect, the reciprocity-based transmission comprises reciprocity-based beamforming.

According to another embodiment of the fourth aspect, freely combinable with other embodiments thereof, the Rx distribution network channel estimates are given larger weights than Rx and Tx distribution network channel estimate weights.

According to another embodiment of the fourth aspect, freely combinable with other embodiments thereof, the wireless device further is caused to obtain information of an array structure of the set of Rx and Tx distribution networks and of an array structure of the set of Rx distribution networks, wherein the obtained information is utilized for the reciprocity-based beamforming.

According to another embodiment of the fourth aspect, freely combinable with other embodiments thereof, the antenna elements of the set of Rx distribution networks are interlaced with the antenna elements of the set of Rx and Tx distribution networks.

According to a fifth aspect there is presented a computer program for reciprocity-based transmission in a radio communication network. The computer program comprises computer program code which, when run in a base station, causes the base station to obtain a channel estimation of Rx quantities of a set of Rx and Tx distribution networks, obtain a channel estimation of Rx quantities of a set of Rx distribution networks, and to perform reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission.

According to a sixth aspect there is presented a computer program for reciprocity-based transmission in a radio communication network. The computer program comprises computer program code which, when run in a wireless device, causes the wireless device to obtain a channel estimation of Rx quantities of a set of Rx and Tx distribution networks, obtain a channel estimation of Rx quantities of a set of Rx distribution networks, and to perform reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission.

Computer program products comprising a computer program and a computer readable storage means on which the computer program is stored is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 8 illustrates a complex channel phase rotation according to an embodiment presented herein;

FIGS. 9-10 are flow charts illustrating methods for embodiments presented herein;

DETAILED DESCRIPTION

Figure 1:
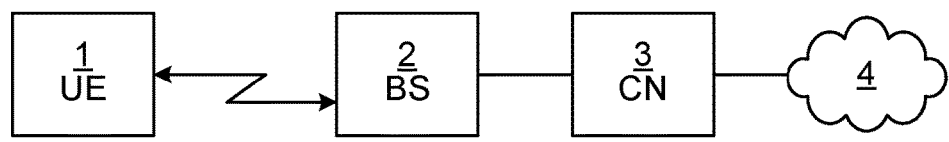
FIG. 1 is a schematic diagram illustrating an environment wherein embodiments presented herein can be applied.

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

As the mobile communication systems move towards the fifth generation (5G) of the 3rd Generation Partnership Project (3GPP), where most bands initially will be time division duplex (TDD) bands, it would be attractive to make use of reciprocity-based beamforming, i.e., utilizing the fact that the radio channel is reciprocal and base Tx beamforming weights on the exact corresponding Rx signal. An estimated UL channel on the Rx is reciprocal to the DL channel estimated on the same antenna. Due to reciprocity, it is thus attractive to have equal numbers of Rx and Tx antennas. However, the traditional link budget imbalance between UL and DL is still valid.

In existing solutions, there are typically an equal number of receive (Rx) and transmit (Tx) antennas to allow reciprocity-based transmission. An antenna array with different numbers of Rx and Tx antennas are not reciprocal per se. A straight forward solution for managing reciprocity-based transmission with different numbers of Rx and Tx antennas is just to disregard the additional number of Rx antennas in Tx mode, but that would be a waste of resources.

Embodiments for utilizing additional Rx antennas (or sub-arrays) to improve reciprocity-based downlink (DL) transmissions is presented, by utilizing knowledge of the structure of the antenna, i.e., how the antenna elements (or sub-arrays) of the antenna are placed in relation to each other.

More Rx antennas than Tx antennas may be used to improve reciprocity-based beamforming. Improved beamforming may improve performance through narrower beams, hence higher array gain, and better estimation of uplink (UL) Rx quantities. Improved performance may also be achieved through improved spatial resolution, keeping the number of Tx branches constant.

The reason to use additional Rx distribution networks instead of additional Rx/Tx distribution networks, is that they are cheaper than Rx/Tx distribution networks.

By using more Rx than Tx antenna elements in reciprocity-based transmission, the DL performance can be improved. By utilizing measurements from an Rx-only array and by combining them with measurements from an Rx/Tx array, a better channel estimate can be obtained, compared to when only the directly reciprocal Rx/Tx array is used. Optionally, further together with knowledge of the complete array structure, such as absolute and/or relative positions of elements in both the Rx/Tx array and the Rx array, the channel estimates can be improved. Examples of antenna elements that may be used in reciprocity-based transmission are slot, patch, horn and dipole. It should be noted antenna element in this text could also be understood as antenna sub-array depending on implementation, typically in the case when several antenna elements form a sub-array through fixed combining, e.g. passively in a radio frequency distribution network.

An Rx or Tx distribution network comprises antenna element, power amplifier or low noise amplifier, and cabling. Even though a set of Rx distribution networks may comprise a plurality of Rx distribution networks it may also consist of only one Rx distribution network. An Rx distribution network only has Rx, and Rx and Tx distribution networks have always same number of Rx and Tx.

In one embodiment, the structure of the antenna is such that the Rx-only antenna elements are interlaced with the combined Rx/Tx antenna elements, with the same distance between the antenna elements and consequently twice the distance between the combined Rx/Tx antenna elements. The distance between the antenna elements would traditionally typically be in the order of half a wavelength, which would result in a distance between the combined Rx/Tx antenna elements in the order of a wavelength.

Figure 2A:
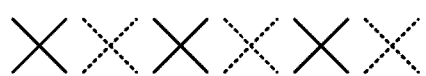
FIGS. 2A-B show examples of interlaced array structures.
Figure 2B:
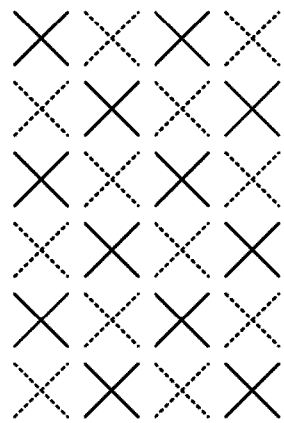

Two such interlace antenna array structures are schematically depicted in FIG. 2. A uniform linear array (ULA) is illustrated in FIG. 2A, and a uniform planar array (UPA) is illustrated in FIG. 2B. The black crosses depict Tx/Rx antenna elements and the dotted crosses depict Rx only antenna elements.

The interlace structure has some consequence for transmission effects. The Tx will now be sub-critically sampled spatially, resulting in aliasing, known as grating lobes. Furthermore, the Tx antenna main lobe or beam will be narrower. At a first glance, the introduction of grating lobes could be viewed negatively. The narrower main beam, however, is positive, since this has the effect that a higher portion of the main beam will hit the intended user and not be spread as interference towards other nearby users. The narrower beam also has the effect that the spatial resolution is improved, allowing for simultaneous scheduling of user closer to each other.

Figures 3A, 3B, 3C:
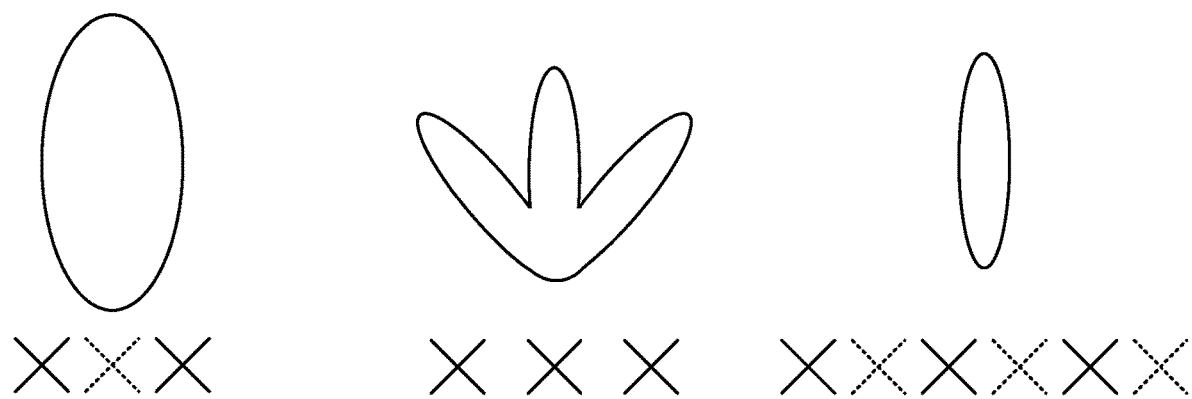
FIGS. 3A-C illustrates antenna patterns for the antenna structures as shown in FIG. 2A.

Illustrative examples of beam shapes for ULA structures are depicted in FIG. 3. FIG. 3A illustrates a beam shape for an array structure with only one additional Rx antenna in between two Rx/Tx antennas. In FIG. 3B the distance between combined Rx/Tx antennas are increased to be distanced correspondingly as in FIG. 3A, but without interlaced Rx antennas, which gives a Tx antenna pattern with grating lobes. FIG. 3C shows the antenna structure of FIG. 2A with a narrow Rx antenna pattern beam shape. Interlacing Rx-only antennas thus removes the grating lobes from the Rx antenna pattern.

Since the Rx antennas is still critically sampled spatially, there is no aliasing effect, or grating lobes, in the receiver. Consequently, desired quantities can be estimated well in the UL. One example of such a desired quantity is direction of arrival, and other are amplitude and phase. This information can then be directly applied for the DL Tx transmission. Since the antenna structure is known, the DL Tx effect of grating lobes is known, and no users will be co-scheduled where a grating lobe is present.

In another embodiment, the additional Rx-only antenna elements are interlaced but the original distance between the combined Rx/Tx antenna elements is more or less kept, e.g. to maintain the form factor of the balanced Rx/Tx antenna. The Rx elements will thus be spaced apart a quarter of a wavelength when the Rx/Tx elements are spaced apart half a wavelength and the Rx only elements are spaced apart half a wavelength. This results in a main beam with the same width as before and no grating lobes are introduced. However, performance can still be improved due to the improved performance of the estimation of the UL quantities required for DL Tx transmission.

In other embodiments, other structures may be applied. In essence, the Rx-only elements may be placed anywhere, as long as they are close enough to the combined Rx/Tx antenna elements, given a non-zero spatial correlation. With knowledge of the total antenna structure, knowledge of the channel (typically estimate thereof) in one location can be used to predict the channel for another location in the vicinity (within a few wavelengths) of antennas used for estimation of the channel, as long as the correlation is above a certain threshold. The threshold may e.g. be in the span of 0-0.3. This typically requires a method where a structure of the channel has to be assumed. The procedure for this may be performed in three steps.

1: Assume a model structure of the channel.

2: Given channel information, e.g. measurements, at one location, estimate quantities of the model assumed in 1 (describing current realization of the channel model).

3: Given displacement information for the location where channel is to be estimated, the parameter estimates of 2 are used in model assumed in 1 to produce a channel estimate.

With such a method sufficient accurate channel information can be obtained to enable beamforming for relatively large extrapolation displacements. Such an extrapolation becomes more valid the more structure there is in the channel (less random reflection) which is the case for typical suburban and rural deployments where the benefit from more Rx antennas than Tx antennas is the largest.

Figure 4A:
FIGS. 4A-B shows examples of non-interlaced array structures with co-located Rx and Rx/Tx panels.
Figure 4B:
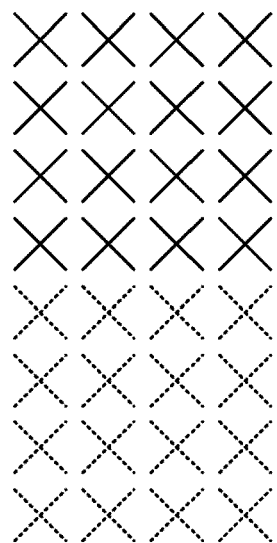

In another embodiment, knowledge of channel and array structures is used to improve channel estimate and array measurement combining. One such model could be to assume a single direction of arrival, which hence for a ULA leads to a single phase shift difference between two displaced, identical array geometries. As an example, non-interlaced ULA and UPA geometries with co-located Rx and Rx/Tx arrays are shown in FIG. 4. FIG. 4A shows a co-located ULA, and a co-located UPA is shown in FIG. 4B. The black crosses depict Tx/Rx antenna elements and the dotted crosses depict Rx only antenna elements.

Large antenna array systems, having 16 or more elements/subarrays, may use beamspace processing for estimating the channel conditions, compared to element-space processing. In beamspace processing, one physical direction imposes an inherent structure in the channel (per beam), which hence increases the validity of simple channel assumptions, like the simple phase shift (rotation) in above embodiment, and example below.

Figure 5:
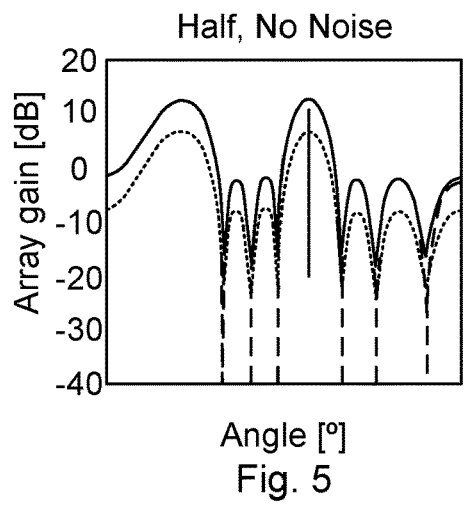
FIGS. 5-6 illustrates Rx beam shapes according to an embodiment presented herein.
Figure 6:
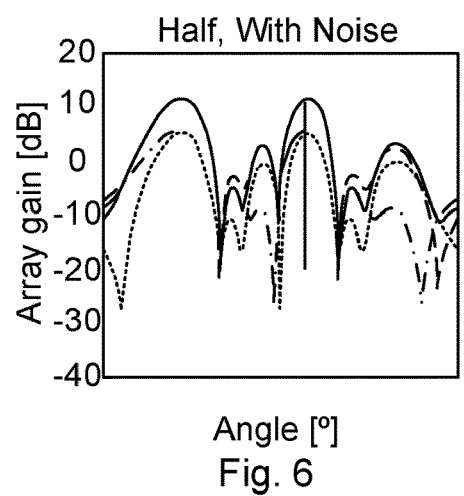

As an example of feasibility, an ULA of 8 elements has been simulated. The array consists of 4 Rx and 4 Rx/Tx antenna elements, in an interlaced structure, similar to the one depicted in FIG. 2A. A simplistic channel with one user equipment (UE) located at 13 degrees off boresight (90+13=103 degrees) and a channel spread of ~20 degrees (around UE) is assumed. In the case when noise is added a signal-to-noise ration (SNR) of 3 dB has been used. FIGS. 5-6 show Rx beam shapes used for the exemplified scenario, estimated to be used for the DL, i.e. the 4 element Tx array (being half the full array). FIGS. 5-6 depict shape of the array gain vs angle for Rx only, Rx/Tx, ideal combination of Rx and Rx/Tx arrays, and for a coherent combination of Rx/Tx and Rx arrays with estimated phase dislocation, without and with noise, respectively. For the ideal combination; the channel between the user to the Rx and user to the Rx/Tx array are identical. This would, in reality, correspond to the Rx and Rx/Tx array being perfectly co-located. The dotted curve $G_1$ has a shape of gain vs angle for the Rx/Tx array and depicts the array response thereof. The dash dotted curve $G_2$ (completely overlapped with $G_1$ in FIG. 5) has a shape of gain vs angle for the Rx only array and depicts the array response thereof. As can be observed $G_1$ and $G_2$ are similar since the array geometry is identical and the displacement is only $0.5\lambda$ between the phase centers of the Rx and Rx/Tx antenna arrays. The solid curve $G_{Perfect}$ is the shape of the gain vs angle for the ideal combination of two identical collocated arrays, experiencing identical channel response, (with uncorrelated, independent and identically distributed Gaussian noise). As can be noted there is a ~6 dB gain coming from double received energy (3 dB) and coherent array gain (3 dB). The dashed curve is the shape of gain vs angle for the array gain obtained when combining signals from the Rx/Tx array and Rx-only array. The combined channel response can be written as:

$$h_{comb} = h_{RxTx} + h_{Rx} e^{i\alpha} \tag{1}$$

where $\alpha$ is the estimated phase difference in array response, assuming a single planar wave, due to the $0.5\lambda$ array displacement. As noted for the case without noise the simple combination above provides almost identical result as the perfect combination (non-physically feasible), and even with 3 dB SNR the difference is small.

Figure 7:
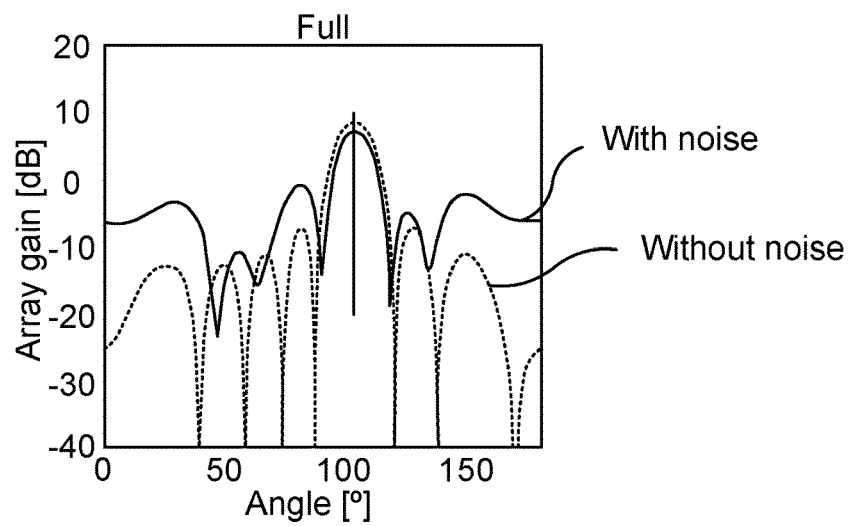
FIG. 7 illustrates an Rx beam shape for a full array of 8 elements.

In FIG. 7, the Rx gain vs angle is shown. This assumes a coherent reception on the full element array (i.e. 8 elements). The main beam width is about as wide as the separate 4-element arrays, however without grating lobes.

A visual explanation of equation (1) is given in FIG. 8. The dotted curve shows the 4 complex channel coefficients for the Rx/Tx array (leading to $G_1$ in FIGS. 5-6). The solid curve shows the 4 complex channel coefficients for the Rx array (leading to $G_2$ in FIGS. 5-6). The dashed curve is the phase-rotated $h_{G2}$ response according to equation (1). The perfect combination $G_{perfect}$ would be the sum of two identical dotted curves $G_1$.

In one embodiment, different weighting may be applied between the Rx-only and the combined Rx/Tx antenna elements in the estimation process, since the signal quality is better on the Rx-only antenna element, since the noise factor is lower in absence of a Tx radio chain.

In one embodiment, the interlacing may be done in the vertical domain (not illustrated), in another embodiment in the horizontal domain (FIG. 2A), and in yet another embodiment in both the vertical and the horizontal domain simultaneously (FIG. 2B).

The use of more Rx than Rx/Tx may also be implemented in a terminal for UL reciprocity-based transmission and beamforming.

FIG. 1 is a schematic diagram illustrating an environment where embodiments presented herein can be applied. A UE 1 is in connectivity with a base station (BS) 2, in turn connected to a core network (CN) 3, all of a radio communication system. The CN 3 may in turn be connected to Internet 4.

An embodiment of a method for reciprocity-based transmission in a radio communication network is presented with reference to FIG. 10. The method is performed in a base station 2 and comprises obtaining S210 a channel estimation of Rx quantities of a set of Rx and Tx distribution networks, obtaining S220 a channel estimation of Rx quantities of a set of Rx distribution networks, and performing S230 reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission.

The step of performing may further comprise performing reciprocity-based beamforming.

The Rx distribution network channel estimates may be given larger weights than the Rx and Tx distribution network channel estimate weights.

The method may further comprise obtaining S200 information of an array structure of the set of Rx and Tx distribution networks and of an array structure of the set of Rx distribution networks, wherein the obtained information is utilized for the reciprocity-based beamforming.

The antenna elements of the set of Rx distribution networks may be interlaced with the antenna elements of the set of Rx and Tx distribution networks.

An embodiment of a method for reciprocity-based transmission in a radio communication network is presented with reference to FIG. 9. The method is performed in a wireless device 1 and comprises obtaining S110 a channel estimation of Rx quantities of a set of Rx and Tx distribution networks, obtaining S120 a channel estimation of Rx quantities of a set of Rx distribution networks, and performing S130 reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission.

The step of performing may further comprise performing reciprocity-based beamforming.

The Rx distribution network channel estimates may be given larger weights than the Rx and Tx distribution network channel estimate weights.

The method may further comprise obtaining S100 information of an array structure of the set of Rx and Tx distribution networks and of an array structure of the set of Rx distribution networks, wherein the obtained information is utilized for the reciprocity-based beamforming.

The antenna elements of the set of Rx distribution networks may be interlaced with the antenna elements of the set of Rx and Tx distribution networks.

Figure 12:
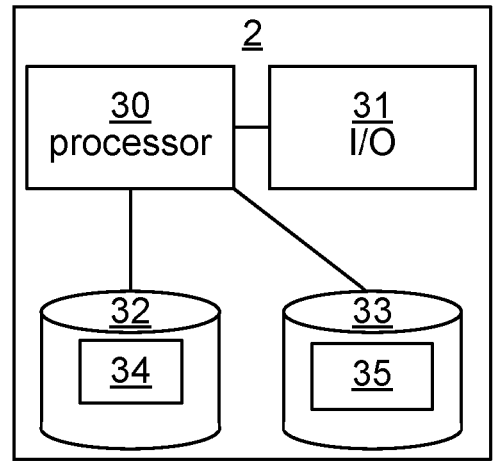

An embodiment of a base station for reciprocity-based transmission in a radio communication network is presented with reference to FIG. 12. The base station 2 comprises a processing circuitry 30 and a computer program product 32, 34 storing instructions 33, 35 that, when executed by the processing circuitry, causes the base station to obtain a channel estimation of Rx quantities of a set of Rx and Tx distribution networks, obtain a channel estimation of Rx quantities of a set of Rx distribution networks, and to perform reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission.

The reciprocity-based transmission may further comprise reciprocity-based beamforming.

The Rx distribution network channel estimates may be given larger weights than the Rx and Tx distribution network channel estimate weights.

The base station may further be caused to obtain information of an array structure of the set of Rx and Tx distribution networks and of an array structure of the set of Rx distribution networks, wherein the obtained information is utilized for the reciprocity-based beamforming.

The antenna elements of the set of Rx distribution networks may be interlaced with the antenna elements of the set of Rx and Tx distribution networks.

FIG. 12 is a schematic diagram showing some components of the base station 2. The processing circuitry 30 may be provided using any combination of one or more of a suitable central processing unit, CPU, multiprocessing circuitry, microcontroller, digital signal processing circuitry, DSP, application specific integrated circuit etc., capable of executing software instructions of a computer program 34 stored in a memory. The memory can thus be considered to be or form part of the computer program product 32. The processing circuitry 30 may be configured to execute methods described herein with reference to FIG. 10.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 33 in the form of a data memory may also be provided, e.g. for reading and/or storing data during execution of software instructions in the processing circuitry 30. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 35, to improve functionality for the base station 2.

The base station 2 may further comprise an input/output (I/O) interface 31 including e.g. a user interface. The base station 2 may further comprise a receiver configured to receive signalling from other nodes, and a transmitter configured to transmit signalling to other nodes (not illustrated). Other components of the base station 2 are omitted in order not to obscure the concepts presented herein.

Figure 14:
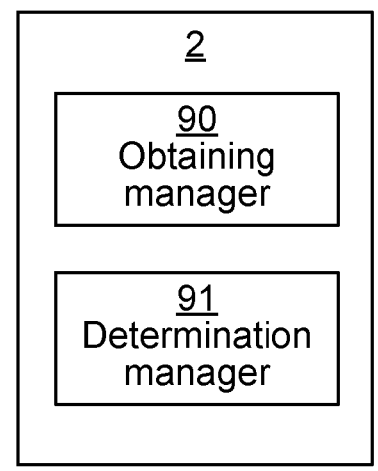

A base station 2 for reciprocity-based beamforming in a radio communication network is presented with reference to FIG. 14. The base station 2 comprises an obtaining manager 90 for obtaining S210 a channel estimation of Rx quantities of a set of Rx and Tx distribution networks, and for obtaining S220 a channel estimation of Rx quantities of a set of Rx distribution networks, and a determination manager 91 for performing S230 reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission.

FIG. 14 is a schematic diagram showing functional blocks of the base station 2. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the method illustrated in FIG. 10, comprising an obtaining manager unit 90 and a determination manger unit 91. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The obtaining manager 90 is for reciprocity-based beamforming in a radio communication network. This module corresponds to the steps S200 and S210 of FIG. 10. This module can e.g. be implemented by the processing circuitry 30 of FIG. 12, when running the computer program.

The determining manger 91 is for reciprocity-based beamforming in a radio communication network. This module corresponds to the steps S220, S230 and S240 of FIG. 10. This module can e.g. be implemented by the processing circuitry 30 of FIG. 12, when running the computer program.

A computer program 34, 35 for reciprocity-based beamforming in a radio communication network is presented with reference to FIG. 12. The computer program comprises computer program code which, when run in a base station 2, causes the base station to obtain a channel estimation of Rx quantities of a set of Rx and Tx distribution networks, obtain a channel estimation of Rx quantities of a set of Rx distribution networks, and to perform reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission.

A computer program product 32, 33 comprising a computer program 34, 35 and a computer readable storage means on which the computer program 34, 35 is stored, is also presented.

Figure 11:
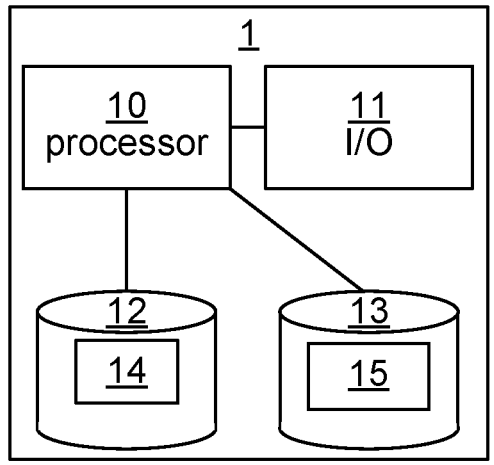
FIGS. 11-12 are schematic diagrams illustrating some components of devices presented herein.

An embodiment of a wireless device 1 for reciprocity-based beamforming in a radio communication network is presented with reference to FIG. 11. The wireless device 1 comprises a processing circuitry 10 and a computer program product 12, 14 storing instructions 13, 15 that, when executed by the processing circuitry, causes the wireless device to obtain a channel estimation of Rx quantities of a set of Rx and Tx distribution networks, obtain a channel estimation of Rx quantities of a set of Rx distribution networks, and to perform reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission.

The reciprocity-based transmission may comprise reciprocity-based beamforming.

The Rx distribution network channel estimates may be given larger weights than Rx and Tx distribution network channel estimate weights.

The wireless device further may further be caused to obtain information of an array structure of the set of Rx and Tx distribution networks and of an array structure of the set of Rx distribution networks, wherein the obtained information is utilized for the reciprocity-based beamforming.

The antenna elements of the set of Rx distribution networks may be interlaced with the antenna elements of the set of Rx and Tx distribution networks.

FIG. 11 is a schematic diagram showing some components of the wireless device 1. The processing circuitry 10 may be provided using any combination of one or more of a suitable central processing unit, CPU, multiprocessing circuitry, microcontroller, digital signal processing circuitry, DSP, application specific integrated circuit etc., capable of executing software instructions of a computer program 14 stored in a memory. The memory can thus be considered to be or form part of the computer program product 12. The processing circuitry 10 may be configured to execute methods described herein with reference to FIG. 9.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the wireless device 1.

The wireless device 1 may further comprise an input/output (I/O) interface 31 including e.g. a user interface. The wireless device 1 may further comprise a receiver configured to receive signalling from other nodes, and a transmitter configured to transmit signalling to other nodes (not illustrated). Other components of the wireless device 1 are omitted in order not to obscure the concepts presented herein.

Figure 13:
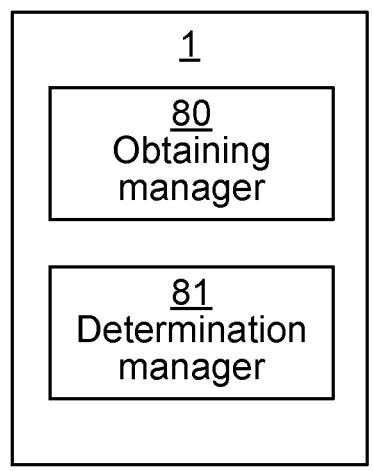
FIG. 13-14 are schematic diagrams illustrating functional module of devices presented herein.

A wireless device 1 for reciprocity-based beamforming in a radio communication network is presented with reference to FIG. 13. The wireless device 1 comprises an obtaining manager 80 for obtaining S110 a channel estimation of Rx quantities of a set of Rx and Tx distribution networks and for obtaining S120 a channel estimation of Rx quantities of a set of Rx distribution networks, and a determination manager for performing S130 reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission.

FIG. 13 is a schematic diagram showing functional blocks of the wireless device 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the method illustrated in FIG. 9, comprising an obtaining manager unit 80 and a determination manger unit 81. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The obtaining manager 80 is for reciprocity-based beamforming in a radio communication network. This module corresponds to the steps S100 and S110 of FIG. 9. This module can e.g. be implemented by the processing circuitry 10 of FIG. 11, when running the computer program.

The determination manger 81 is for reciprocity-based beamforming in a radio communication network. This module corresponds to the steps S120, S130 and S140 of FIG. 9. This module can e.g. be implemented by the processing circuitry 10 of FIG. 11, when running the computer program.

A computer program 14, 15 for compression of two-dimensional data in a network system is presented with reference to FIG. 11. The computer program comprises computer program code which, when run in a wireless device 1, causes the wireless device to obtain a channel estimation of Rx quantities of a set of Rx and Tx distribution networks, obtain a channel estimation of Rx quantities of a set of Rx distribution networks, and to perform reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission.

A computer program product 12, 13 comprising a computer program 14, 15 and a computer readable storage means on which the computer program 14, 15 is stored, is also presented.

The aspects of the present disclosure have mainly been described above with reference to a few embodiments thereof. However, as is readily appreciated by a person skilled in the art, other embodiments than the ones disclosed above are equally possible within the scope of the invention, as defined by the appended patent claims.

The invention claimed is:

1. A method for reciprocity-based transmission in a radio communication network, the method being performed in a base station and comprising:
   obtaining a channel estimation of receive, Rx, quantities of a set of Rx and transmit, Tx, distribution networks;
   obtaining a channel estimation of Rx quantities of a set of Rx distribution networks; and
   performing reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission, the Rx distribution network channel estimates being given larger weights than the Rx and Tx distribution network channel estimate weights.

2. The method according to claim 1, wherein the step of performing further comprises performing reciprocity-based beamforming.

3. The method according to claim 1, further comprising:
   obtaining information of an array structure of the set of Rx and Tx distribution networks and of an array structure of the set of Rx distribution networks, wherein the obtained information is utilized for the reciprocity-based beamforming.

4. The method according to claim 1, wherein antenna elements of the set of Rx distribution networks are interlaced with antenna elements of the set of Rx and Tx distribution networks.

5. A method for reciprocity-based transmission in a radio communication network, the method being performed in a wireless device and comprising:
   obtaining a channel estimation of receive, Rx, quantities of a set of Rx and transmit, Tx, distribution networks;
   obtaining a channel estimation of Rx quantities of a set of Rx distribution networks; and
   performing reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission, the Rx distribution network channel estimates being given larger weights than the Rx and Tx distribution network channel estimate weights.

6. The method according to claim 5, wherein the step of performing further comprises performing reciprocity-based beamforming.

7. The method according to claim 5, further comprising:
   obtaining information of an array structure of the set of Rx and Tx distribution networks and of an array structure of the set of Rx distribution networks, wherein the obtained information is utilized for the reciprocity-based beamforming.

8. The method according to claim 5, wherein antenna elements of the set of Rx distribution networks are interlaced with antenna elements of the set of Rx and Tx distribution networks.

9. A base station for reciprocity-based transmission in a radio communication network, the base station comprising:
   a processing circuitry; and
   a computer program product storing instructions that, when executed by the processing circuitry, causes the base station to:
      obtain a channel estimation of receive, Rx, quantities of a set of Rx and transmit, Tx, distribution networks;
      obtain a channel estimation of Rx quantities of a set of Rx distribution networks; and
      perform reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission, the Rx distribution network channel estimates being given larger weights than the Rx and Tx distribution network channel estimate weights.

10. The base station according to claim 9, wherein the reciprocity-based transmission further comprises reciprocity-based beamforming.

11. The base station according to claim 9, wherein the base station further is caused to:
   obtain information of an array structure of the set of Rx and Tx distribution networks and of an array structure of the set of Rx distribution networks, wherein the obtained information is utilized for the reciprocity-based beamforming.

12. The base station according to claim 9, wherein antenna elements of the set of Rx distribution networks are interlaced with antenna elements of the set of Rx and Tx distribution networks.

13. A wireless device for reciprocity-based transmission in a radio communication network, the wireless device comprising:
   a processing circuitry; and
   a computer program product storing instructions that, when executed by the processing circuitry, causes the wireless device to:
      obtain a channel estimation of receive, Rx, quantities of a set of Rx and transmit, Tx, distribution networks;
      obtain a channel estimation of Rx quantities of a set of Rx distribution networks; and
      perform reciprocity-based transmission with utilization of the obtained channel estimation of Rx quantities of both the set of Rx and Tx distribution network and the set of Rx distribution network, whereby channel estimation of Rx quantities of more Rx distribution networks than Tx distribution networks are utilized for the reciprocity-based transmission, the Rx distribution network channel estimates being given larger weights than Rx and Tx distribution network channel estimate weights.

14. The wireless device according to claim 13, wherein the reciprocity-based transmission comprises reciprocity-based beamforming.

15. The wireless device according to claim 13, wherein the wireless device further is caused to:
   obtain information of an array structure of the set of Rx and Tx distribution networks and of an array structure of the set of Rx distribution networks, wherein the obtained information is utilized for the reciprocity-based beamforming.

16. The wireless device according to claim 13, wherein antenna elements of the set of Rx distribution networks are interlaced with antenna elements of the set of Rx and Tx distribution networks.

* * * * *